(No Model.)
S. DARLING.
SCREW NUT.
No. 253,266. Patented Feb. 7, 1882.
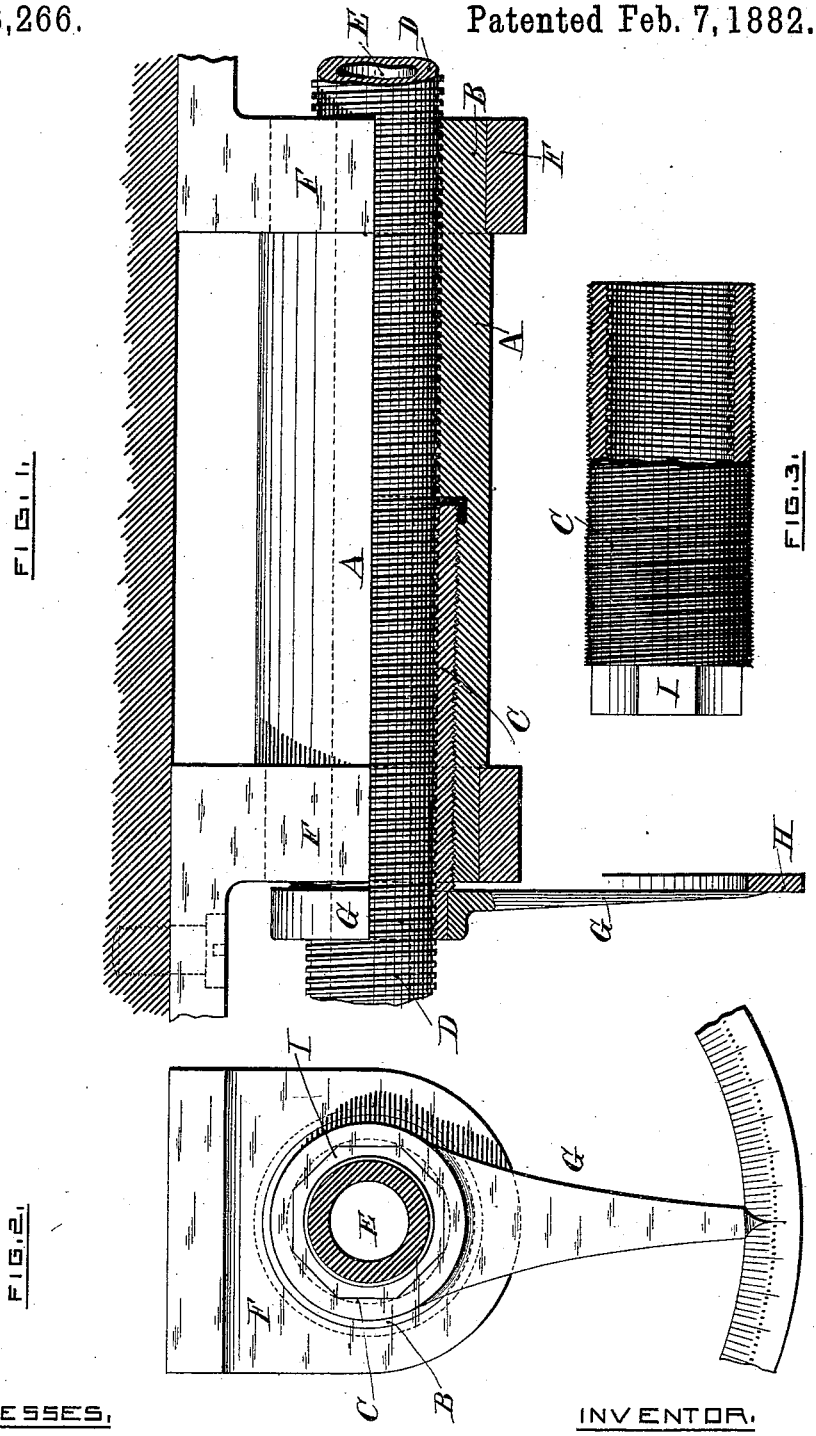
WITNESSES:
Jacob Kettner
John E. Hall
INVENTOR:
Saml. Darling

UNITED STATES PATENT OFFICE.

SAMUEL DARLING, OF PROVIDENCE, RHODE ISLAND.

SCREW-NUT.

SPECIFICATION forming part of Letters Patent No. 253,266, dated February 7, 1882.

Application filed October 29, 1881. (No model.)

*To all whom it may concern:*

Be it known that I, SAMUEL DARLING, of the city and county of Providence, State of Rhode Island, have invented a certain new and useful Improvement in Nuts, and the mode of using them, for the leading-screws of dividing and screw-cutting engines, micrometer-screws, and all screws where great accuracy is required; and I do hereby declare that the following is a clear, full, and exact description of the invention, which will enable others skilled in the art to which it appertains to make and use the same.

The object of my invention is to so construct the nut that by its proper adjustment and use the thread of the nut and the thread of the screw upon which it runs may both be made and kept of the same and uniform pitch, and all longitudinal play of the nut on the screw prevented, and that it may be adjusted with facility and with the great accuracy which its use requires; and my invention consists in making the nut in two parts, one part being permanently fixed to the machine and the other part made adjustable; in making the fixed part of the nut and a holder for the adjustable part in one piece, the adjustable part being held in the holder in exact line with the fixed part; in attaching the adjustable part of the nut to the holder by means of a screw cut upon its outer contour corresponding to and accurately fitting a female screw in the holder; in providing the adjustable part with a radial index-arm by which, in connection with a graduated scale, it can be turned and adjusted, and in arranging the fixed part of the nut and the holder for the adjustable part upon bearings to be automatically turned when the machine is in operation; in making the threads of the nut and the threads of the screw upon which it runs of the same and uniform pitch by attrition, the nut being alternately adjusted and run on the screw for that purpose; and, also, in making both parts of the nut and holder of the same kind of metal of which the screw is made upon which the nut is to run.

In the drawings, forming part of this specification, Figure 1 represents a side elevation, part sectional, of my improved nut mounted on bearings. Fig. 2 represents a transverse section of the same, which also shows a side elevation of the index-arm and segment of the graduated circle. Fig. 3 represents a side elevation, part sectional, of the adjustable part of the nut.

The letter A represents the fixed part of the nut and the holder for the adjustable part; B, the bearings of the holder; C, the adjustable part of the nut; D, screw upon which the nut runs; E, hole in the screw; F, boxes for the bearings of the holder; G, index-arm; H, graduated segment; I, end of the adjustable part of the nut made in octagonal shape.

Heretofore square-thread two-part nuts have been made by clamping the two parts together with screw-bolts, and adjusted by taking them apart and filing to bring them nearer together, or putting paper between them to carry them farther apart. (See the work of Charles Holtzapffel, 1856, page 664, fig. 623.) This method has been employed where screws were badly worn to prevent the loss of time in changing direction occasioned by the play between the threads of the nut and the screw. The said method answers the purpose where only common accuracy is needed—say within one one-thousandth of an inch ($\frac{1}{1000}$ in.)—but it is evident that great accuracy cannot be obtained by that method without too great an expenditure of time and money. The two parts could not even be loosened and tightened again without producing a greater variation than would be allowable in my improved method of truing a nut and screw; dust would get between the parts, and where two bolts are used one would be screwed harder than the other, which would throw the parts out of line with each other; but that method was not used nor intended to be used for truing a screw, not being adapted to that purpose. Doubtless, in truing a screw the nut would have to be changed a thousand times, more or less, and if done by filing the screw would have to be dismounted each time, and if done by spreading the two parts of the nut nothing could be made thin enough for the purpose, and when completed and put into use the nut would have to be adjusted, perhaps every day, and the machine would have to be taken apart for that purpose. The subject will be better understood when it is known that to true a screw and nut in accordance with my improvement it will be necessary to be able to move the adjustable part of the nut longitudinally as little as one one-hundred-thousandth ($\frac{1}{100000}$) of an inch, and perhaps one-half of that amount, the former being one hundred times and the latter two hundred times less than one thickness of the thinnest tissue-paper.

In the last stages of the process of truing a nut and screw according to my invention no grinding material can be used, and the threads of the nut and screw are worn true by rubbing against each other with nothing but oil on them, and the two parts of the nut being held in a manner so that neither can yield. It will be easily seen how very little the adjustable part can be moved at a time.

The nut, table to which it is attached, holder of the adjustable part, and the screw should all be made of the same kind of metal; and both nut and screw must be kept of the same temperature throughout during the process of truing and when in use after being trued, and for that purpose I use a blower, according to my patent for "improvement in manufacturing mathematical instruments," dated October 9, 1880, and that of May 25, 1880, for "comparing mathematical instruments one with another," and also later improvements in that direction, soon to be patented.

My improved nut is to be used for the most accurate dividing and screw-cutting, and it is well understood by those versed in the art that accurate dividing cannot be done when there is play between the threads of the nut and screw, as lint and fine particles of matter will get between the threads. There is liable to be an error in the work equal to the play between the threads. If it be necessary to divide within one twenty-thousandth ($\frac{1}{20000}$) of an inch, there must not be more than that play between the threads of the nut and screw; and in relation to micrometer screws and nuts, as heretofore made, it is well known to microscopists that the measurements made by them are not to be fully relied upon, on account of the play between the threads of the screw and the nut. No doubt the screw is the most accurate means known of making very fine measurements when there is no perceptible play between the thread of the nut and the screw, and when the pitch is uniform in all parts of the thread.

This improvement is an advance in the art of dividing scales and manufacturing screws, and it is now especially apposite in view of the great accuracy needed and practiced in the mechanic arts.

Mechanics now work by tenths of a thousandth of an inch, instead of hundredths of an inch, which twenty years ago was considered very close, and this great accuracy does not relate solely to divided scales, but to other tools. A machinist's try-square that varies one ten-thousandth of an inch from a right angle is sure to be returned to the manufacturer as incorrect; and this demand for accuracy is not merely caprice on the part of the mechanic, but where it is carried out in the construction of machinery better results are produced in its operation.

My improved nut may be mounted on bearings and made to turn according to my Letters Patent dated April 6, 1880, or be made stationary. It must be made of the same kind of metal of which the screw upon which it is to run is made, so that variations in temperature will affect both alike.

It is not necessary to give particular directions for making my improved nut, as any good machinist can make it. The principal points to be observed in doing the work are to have the adjustable part of the nut stand in exact line with the fixed part, the outer contour of the adjustable part concentric with the hole through its center; to have the external screw fit accurately and closely the female screw in the holder, and it is best to make the fit so tight that no other means of fastening the nut will be needed to keep it from turning in the holder. I should preferably make the screw and the adjustable part of the nut and the female screw in the holder twenty threads to the inch, and the radial index-arm about ten inches long. The graduated segment H may be a quarter of a circle, and graduated into twenty-five hundred parts, one division moving the nut longitudinally one two-hundred-thousandth of an inch ($\frac{1}{200000}$). The arm G should be very rigidly and firmly attached to the end of the nut I, and, if necessary, it may be made square, ($\square$,) instead of octagonal shape, to make a more substantial fastening. In truing a screw by this nut the screw and nut must be kept of the same temperature during the process, the screw making about fifty revolutions per minute, and the nut should run nearly off the screw at each end.

At the beginning of the grinding, while the surfaces are rough, the radial arm G may be moved several divisions at a time; but as the surfaces become smoother by grinding the arm must be moved less, and when nearly finished probably one division is all that the arm can be moved at a time. The process of grinding should continue until the screw will turn easily in the nut without any perceptible play longitudinally. To ascertain when the screw has become sufficiently true, hold the screw rigidly on centers, make a fine line on the nut or holder of the nut, and use a microscope, testing the screw its whole length. When in use a similar test, which will enable the operator to keep the screw up to the standard accuracy, should be made as often as it may by experience be found to be necessary. A fine line on the moving table or tool-holder to which the nut is attached will be convenient for the use of the microscope. When in use both screw and nut must be kept of the same and uniform temperature throughout.

It is evident that my improved nut can be made in other forms without departing from the principle of the invention. For instance, the adjustable part may be fitted in the holder without a screw upon its surface and held and adjusted by other means. It may have a short screw on one end, the other part being a smooth fit; or it may have a tight smooth fit the whole length of the holder, and so arranged that it can have no longitudinal motion, the adjustment being made by turning it, or the nut may be made in more than two parts.

In any arrangement of the nut herein described the arm G can be made to hold the nut from turning in the holder by clamping it to the graduated segment which is attached firmly to the machine.

Having thus described my invention, what I claim as new, and desire to secure by Letters Patent, is—

1. A nut made in two parts for the leading-screws of dividing and screw-cutting engines, micrometers, and all screws that require great accuracy, one part being fixed and the other adjustable independently of the fixed part, the fixed part and a holder for the adjustable part being made in one piece or separate pieces rigidly held together, the same being constructed and operating substantially as herein described, for the purpose set forth.

2. A nut made in two parts, one part being fixed and the other adjustable, the fixed part and a holder for the adjustable part being made in one piece or separate pieces rigidly held together, the adjustable part having a screw on a part or the whole of its outer contour fitting a female screw in the holder by which it is held and adjusted, substantially as described.

3. A nut made in two or more parts, one or more of the parts being adjustable when used for truing screws by attrition, the parts being constructed and operating substantially as herein described.

4. A nut made in two or more parts, one of the parts being adjustable and having a radial index-arm for adjusting the nut, to be used with or without a graduated scale, substantially as described.

5. A nut in two or more parts, one or more of the parts being adjustable, mounted on bearings or centers, substantially as described, and for the purpose set forth.

SAML. DARLING.

Witnesses:
  H. R. DAVIS,
  C. H. MATHEWSON.